Sept. 15, 1970  R. L. ELDER  3,528,138
COTTON CLEANER
Filed June 3, 1968  2 Sheets-Sheet 1
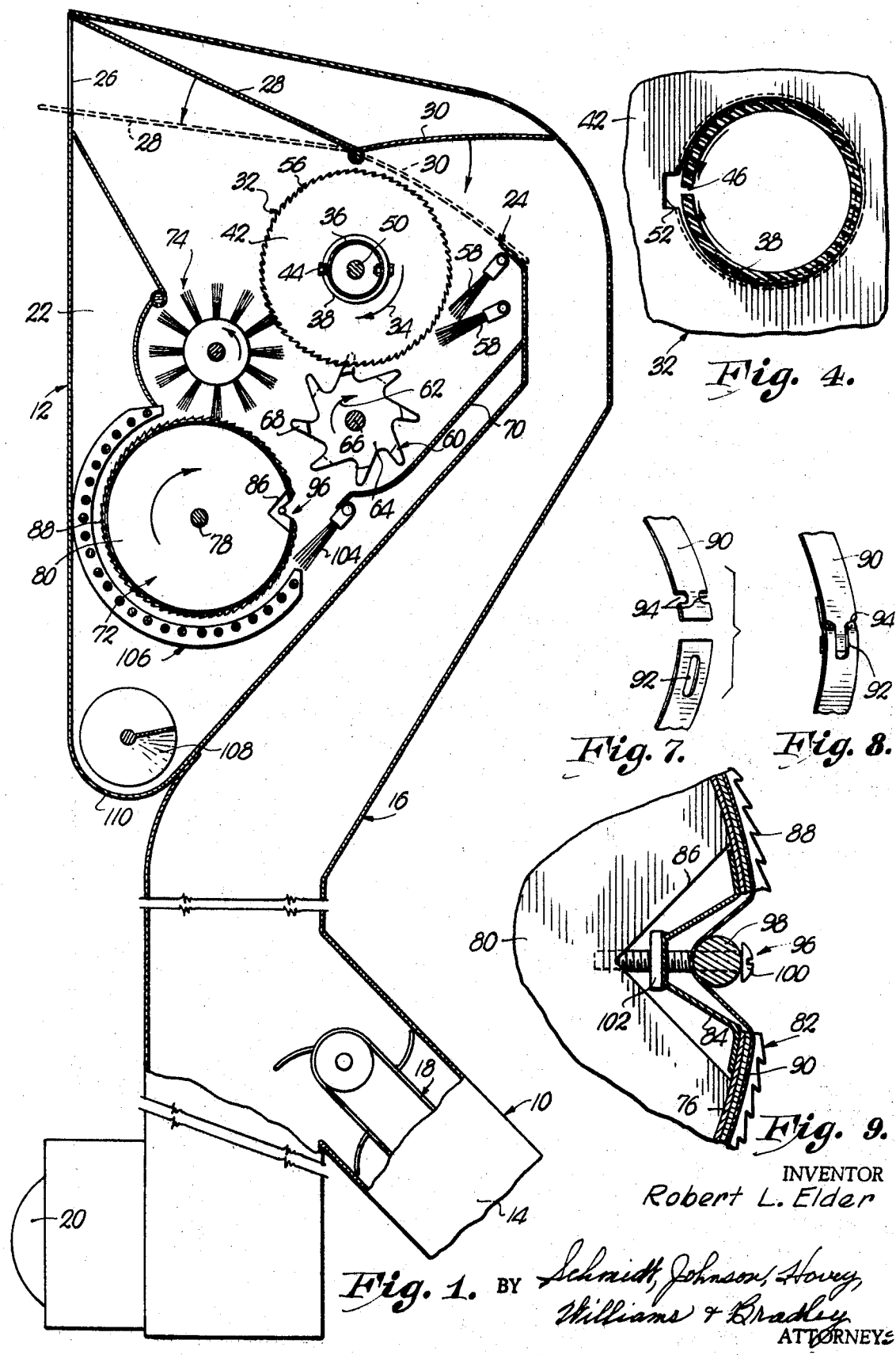
INVENTOR
Robert L. Elder
BY Schmidt, Johnson, Hovey,
Williams & Bradley
ATTORNEYS

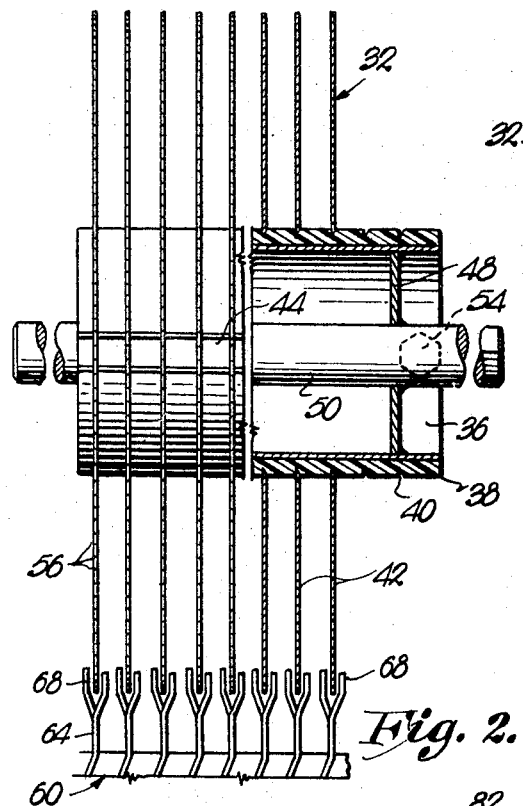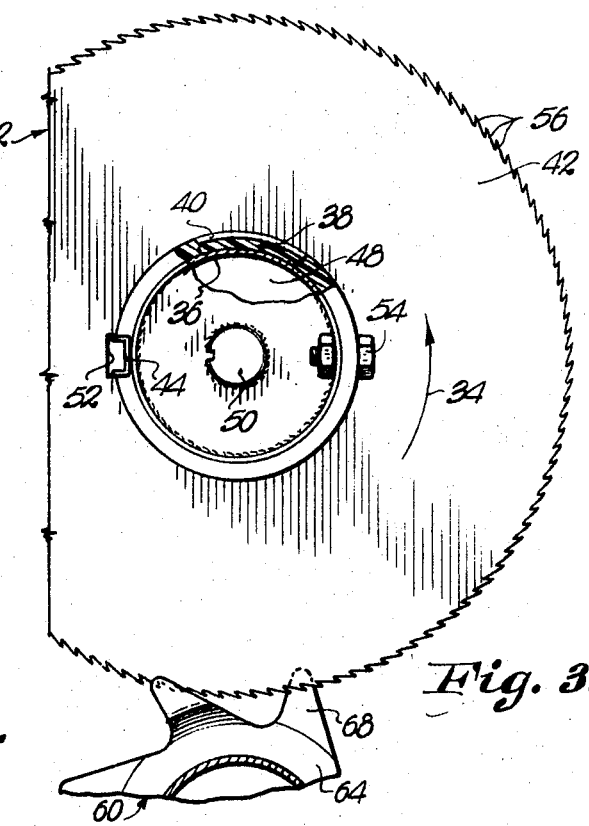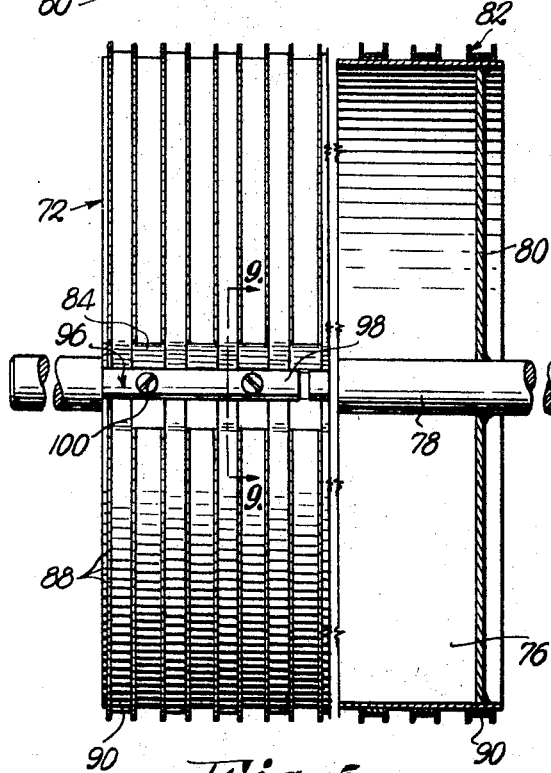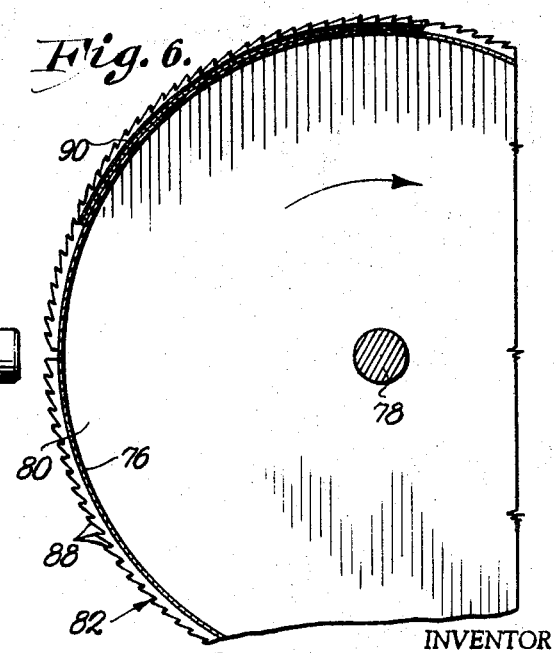

United States Patent Office 3,528,138
Patented Sept. 15, 1970

3,528,138
COTTON CLEANER
Robert L. Elder, Newton, Kans., assignor to Hesston
Corporation, Hesston, Kans., a corporation of Kansas
Filed June 3, 1968, Ser. No. 734,088
Int. Cl. D01b 3/00
U.S. Cl. 19—203                                    1 Claim

ABSTRACT OF THE DISCLOSURE

A cleaner for cotton pickers feeds the harvested cotton into an air stream directed toward a zone of collection of the cleaned cotton. The cotton and trash entrained therein are intercepted by a rotary grid capable of permitting continued flow of the air to the collection zone. Trash is combed from the grid to extract it from the cotton, whereas the clean cotton is doffed from the grid and redirected into the air stream. A reclaimer saw assembly receives the trash and such cotton still entrained therein, such additional cotton also being extracted and redirected into the air stream. Both the grid and the reclaimer saw assembly are constructed so as to be especially adapted for the aforesaid purposes.

---

It is an important object of my instant invention to provide a cotton cleaner especially adapted for use in conjunction with a cotton harvester, and capable of handling a high ratio of trash to cotton so as to rapidly and continually feed only clean cotton to the storage bin of the harvester and immediately return only the extracted trash to the field, all without interruption, slowdown or other adverse effects upon the harvesting operation itself.

Another important object of the present invention is the provision of a cotton picker which utilizes a blast of air for not only feeding the harvested cotton and trash to its cleaner but for delivering the clean cotton to its collection bin, the results being attained by the use of a novel rotary grid which extracts the harvested material from the air stream, a rotary comb which extracts the trash from the cotton, and a doffer which redirects the clean cotton into the air stream.

Other objects include improvements in the rotary grid and in the retainer saw which reduce production costs by virtue of novel and simple steps in assembly during manufacture thereof.

In the drawings:

FIG. 1 is a fragmentary side elevational view of a cotton harvesting machine, parts being broken away and in section to reveal details of construction of the cotton cleaner thereof forming the subject matter of the present invention;

FIG. 2 is an enlarged elevational view, partially in section, of the rotary grid and the rotary comb illustrated in FIG. 1;

FIG. 3 is an enlarged, fragmentary end view, partially in section, of the components shown in FIG. 2;

FIG. 4 is a view similar to FIG. 3 illustrating the manner of assembling the individual saw elements on the resilient tube;

FIG. 5 is a view similar to FIG. 2 of the reclaimer saw assembly shown in FIG. 1;

FIG. 6 is a view similar to FIG. 3 of such saw assembly;

FIG. 7 is a fragmentary perspective view illustrating the interlockable ends of one of the retainer bands of the reclaimer saw assembly;

FIG. 8 is a view similar to FIG. 7 showing the ends of the band interlocked; and FIG. 9 is an enlarged fragmentary view similar to FIG. 1 showing the manner of clamping the saw element to the cylinder of the reclaimer saw assembly.

A portion only of cotton harvester 10 with which cotton cleaner 12 is adapted to be used appears in FIG. 1 of the drawings and includes a tube 14 communicating with air chute 16 and provided with an elevator 18 for receiving the harvested cotton, together with such trash as may be entrained therein and delivering it into an upwardly moving air blast within the chute 16 generated by a blower 20.

The cleaner 12 includes a housing 22 having an inlet 24 communicating with chute 16 and an outlet 26 in opposed relationship to the inlet 24. The outlet 26 may be placed into communication with the collection bin of the harvester 10 (not shown) for the cleaned cotton through use of any suitable conduit structure.

In the event it is desired to bypass the cleaner 12 it is but necessary to lower a panel 28 to the dotted line position shown in FIG. 1 and to lower a second panel 30 across inlet 24, as shown by dotted lines in FIG. 1, whereupon the harvested material will be directed by the air blast in chute 16 through the outlet 26 directly to the aforementioned collection bin of the harvester 10. Such conditions may arise, for example, when the cotton is substantially free of trash or, more likely, when the harvested material has such a relatively high moisture content that the cleaner 12 will not be as effective as might be desired in removing the trash from the cotton.

When, however, the panels 28 and 30 are in their normal full line position illustrated in FIG. 1, all of the harvested material, including cotton and trash, delivered to the chute 16 by the elevator 18 will be carried by the air blast through the inlet 24 of housing 22. It is at this point where it becomes important to extract the harvested material from the air and to do so in such manner as to cause the air to move across the housing 22 and exhaust therefrom through the outlet 26.

Accordingly, there is provided a rotary grid 32 within the housing 22 at the inlet 24 disposed to intercept all of the harvested material and to carry the latter downwardly and inwardly into the housing 22 in the direction of rotation of the grid 32 as indicated by arrow 34 in FIG. 1. Referring, therefore, also to FIGS. 2-4, the rotary grid 32 includes an elongated rotary drum 36, an elongated, longitudinally split tube 38 of resilient material such as rubber or plastic, secured to the drum 36 therearound and provided with a plurality of spaced circumferential grooves 40, a disc 42 surrounding the tube 38 within each groove 40 respectively, and a retainer 44 secured to the drum 36 longitudinally of the latter within the split 46 of tube 38.

The drum 36 is provided with a number of plates, walls, spiders or the like 48 rigidly securing the same to a driven shaft 50 within the drum 36, concentric thereto and carried by the housing 22 for rotation about a substantially horizontal axis as indicated by arrow 34 (FIGS. 1 and 3).

The construction of the component parts of grid 32 as thus described and as is illustrated in the drawings, greatly facilitates production techniques, reducing the cost of assembly, and renders such assembly relatively simple, including also an important time-saving factor. The tube 38 is initially held in a condition of reduced diameter by at least partially closing the split 46 as indicated by the arrows in FIG. 4 of the drawings. This permits threading of all of the discs 42 onto the tube 38 in alignment with their corresponding grooves 40. The drum 36 (with its retainer 44 rigidly affixed thereto) is thereupon inserted into the tube 38, expanding the latter to its full diameter and firmly seating the discs 42 within their grooves 40. As noted in FIGS. 3 and 4, each of the discs 42 is provided with a notch 52 for receiving the retainer 44, the latter also fitting within the expanded split 46, thereby preventing relative rotation of the drum 36, the tube 38 and the discs 42. Finally, the drum 36 and the tube 38 are interconnected by a fastener 54.

The discs 42 are provided with sawteeth 56 at their peripheries. Therefore, as above indicated, the air entering inlet 24 passes freely through the rotary grid 32 to the outlet 26, whereas the harvested material including the cotton and the trash entrained therein is carried downwardly and inwardly from the inlet 24 into the housing 22. A number of rows of flexible brushes 58 spanning the distance across the housing 22 immediately below inlet 24 and inclined toward the grid 32 as illustrated in FIG. 1 sweep the cotton and trash firmly into the sawteeth 56 of grid 32 to cause such material to be carried by the grid 32 in the direction of arrow 34 and to assure complete extraction of the material from the air stream.

The harvested material is immediately confronted by a comb 60 spanning the distance across the housing 22 immediately below the grid 32 and rotatable in parallelism with the axis of rotation of shaft 50, but oppositely to the direction of rotation of grid 32 as indicated by arrow 62 in FIG. 1. The comb 60 includes a plurality of fingered elements 64 spaced along shaft 66 and rigidly secured to the latter for rotation therewith, there being a comb element 64 for each disc 42 respectively as indicated in FIG. 2. The fingers 68 of the elements 64 are bent alternately in opposite directions at their outermost free ends. The effect of such fingers 68 is to extract the trash from the cotton, delivering the trash onto and downwardly along an inclined ramp 70 within housing 22 toward a reclaimer saw assembly 72, permitting sawteeth 56 to carry the clean cotton beyond the comb 60 toward a doffer 74.

While the fingers 68 of comb 60 are shown overlapped with respect to the discs 42, if it is found that comb 60 carries too much cotton from the grid 32 to the assembly 72, it is but necessary to lower the shaft 66 to the extent desired.

The saw assembly 72, as in the case of the rotary grid 32, operates to extract cotton from trash and is not only specially made for such purpose but is provided with novel components that are easily, quickly and inexpensively assembled, and replaced from time to time as need be. Assembly 72 includes an elongated cylinder 76 rigidly secured to a shaft 78 by spanner means 80, together with a plurality of transversely U-shaped saw elements 82 extending around the cylinder 76 from one edge of a trough 84 (FIG. 9) to the opposite edge of the trough 84. The cylinder 76 is longitudinally spit and closed by the inwardly offset trough 84 and the spanner plates 80 are provided with notches 86 for clearing trough 84.

The bights of the saw elements 82 bear flatly against the cylinder 76 and their legs are each provided with sawteeth 88.

Elements 82 are clamped to the cylinder 76 in spaced relationship throughout the length of the latter with their sawtoothed flanges extending radially of the cylinder 76 by a band 90 within each element 82 respectively, engaging such bights and surrounding the cylinder 76 across the trough 84. Each of the flexible bands 90 is provided with an interlock of the type shown in FIGS. 7 and 8 which includes a slot 92 and a pair of opposed notches 94.

Take-up means 96 interconnecting the bands 90 and the trough 84 for clamping the bights of the elements 82 tightly against the cylinder 76 includes a plurality of rods 98 extending longitudinally of the trough 84, each spanning the distance across a number of the bands 90. Each rod 98 has a plurality of fasteners 100 extending therethrough between the elements 82, radially of the cylinder 76 and joining rods 98 with trough 84 through use of nuts 102 rigid to trough 84 and threadably receiving the bolt fasteners 100. Accordingly, when the bolts 100 are drawn tightly against the rod 98 it in turn tightly draws the bands 90 into the trough 84, all as is clear in FIGS. 1, 5, 6 and 9.

The trash, and such cotton as may remain therein, being fed to the assembly 72 by the comb 60 is swept firmly into the sawteeth 88 by a brush 104 between the ramp 70 and the leading end of a stationary grid 106 partially surrounding the assembly 72 and serving to retain the cotton on the teeth 88 while permitting the trash to sift by gravitation to the grid 106. The trash is received by a screw conveyor 108 at the bottom of housing 22 within trough portion 110 of the latter, conveyor 108 serving to discharge the trash from the housing 22 back to the ground or field being traversed by the harvesting machine 10.

The elongated brush 74, interposed between grid 32 and assembly 72, and rotatable oppositely to both, doffs the clean cotton from the teeth 56 and from the teeth 88, feeding such cleaned cotton into the air stream emanating from the grid 32 such that the blast of air removes the cotton from the housing 22 through the outlet 26 and to the collection bin of the harvester 10.

Having thus described the invention, what is claimed as new and desired to be secured by Letters Patent is:

1. In a machine for removing trash from cotton:
    a housing having an inlet and an outlet in opposed relation to the inlet;
    a chute communicating with said inlet for directing a blast of air across the housing through said outlet;
    means for feeding cotton having trash entrained therein into said chute for movement by the air blast through said inlet;
    a rotary grid in said housing at the inlet for intercepting the cotton and trash while permitting the air to pass across the housing and exhaust therefrom through the outlet,
    said grid being provided with toothed saw means for extracting the cotton and trash from the air passing across the housing;
    combing structure in the housing for removing trash from said grid to extract the same from the cotton; and
    means in the housing for doffing the clean cotton from said grid and redirecting the same into the air stream flowing from the grid to said outlet, said grid comprising:
        an elongated rotary drum;
        an elongated, longitudinally split tube secured to the drum therearound and provided with a plurality of spaced grooves therearound;
        a disc surrounding the tube within each groove respectively, each disc having saw teeth at its periphery; and
        a retainer secured to the drum longitudinally thereof within the split of the tube,
        each disc having a retainer-receiving notch.

References Cited

UNITED STATES PATENTS

| | | | |
|---|---|---|---|
| 1,069,708 | 8/1913 | Krupp | 19—38 |
| 1,113,310 | 10/1914 | Conrad | 19—37 |
| 1,680,978 | 8/1928 | Garner | 19—35 |
| 1,690,375 | 11/1928 | Mitchell et al. | 19—41 |
| 1,852,851 | 4/1932 | Mitchell | 19—63 |
| 1,934,575 | 11/1933 | Wallace | 19—63 |
| 3,150,417 | 9/1964 | Word | 19—203 |
| 3,172,165 | 3/1965 | Helm | 19—203 |

FOREIGN PATENTS

| | | |
|---|---|---|
| 97 | 1889 | Great Britain. |
| 9,032 | 1911 | Great Britain. |

DORSEY NEWTON, Primary Examiner

U.S. Cl. X.R.

19—63, 97